United States Patent Office 3,437,230
Patented Apr. 8, 1969

3,437,230
HYDRAULIC CYLINDERS
Frederick R. Savory, Sutton-in-Ashfield, England, assignor to Steel Construction & Engineering Co. (Notts.) Limited
Filed Nov. 29, 1967, Ser. No. 686,676
Int. Cl. B65d 45/00
U.S. Cl. 220—55                             6 Claims

ABSTRACT OF THE DISCLOSURE

A hydraulic cylinder has a counterbore to receive a flanged end of a circular end plate, a circular groove in the counterbore enabling a thrust ring formed of segmental locking elements to engage the groove while extending from the groove to overlap a portion of the flanged end, with a locking ring securing the thrust ring in position, means to secure the locking ring in position, and sealing means between the flanged end and the cylinder.

---

Figure 1:
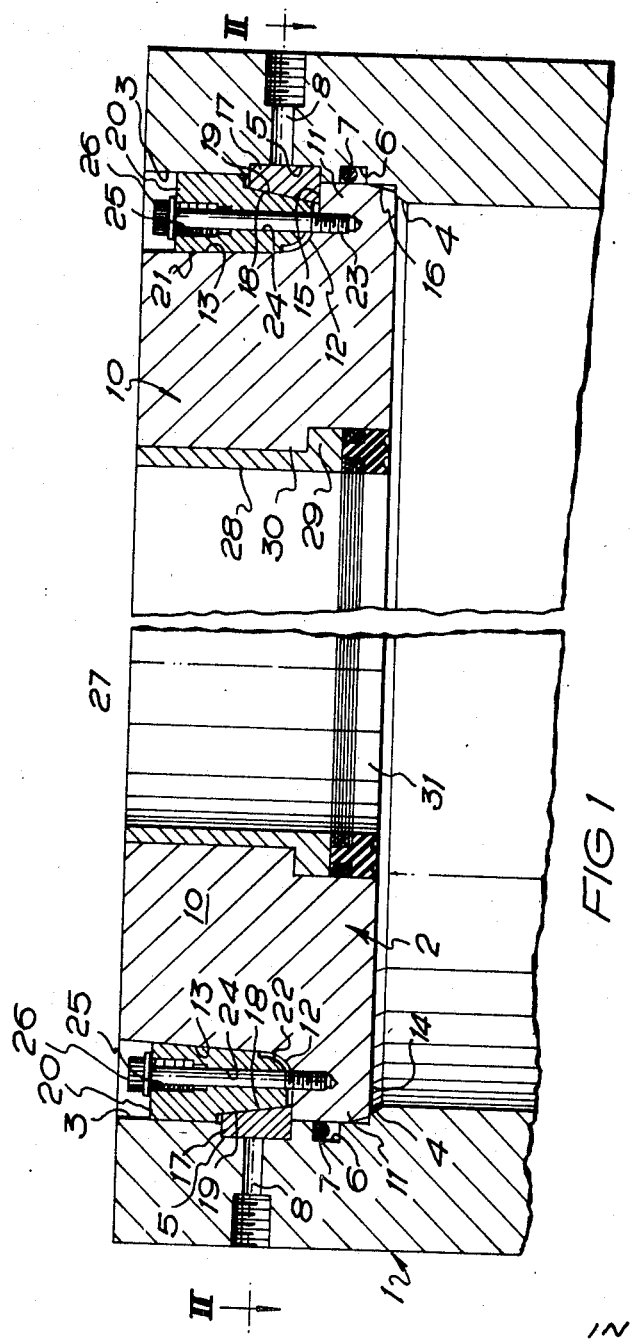

This invention relates to hydraulic cylinders and is concerned with shortening the overall length and diameter by eliminating endplates bolted to flanges, and with providing means for securing an endplate that can be removed and replaced readily, especially in the case of an endplate for the piston rod end of a double-acting cylinder, so as to facilitate rapid replacement of the seal around the hole for the piston rod.

According to the present invention, a hydraulic cylinder has a counterbore to receive a flanged side of a circular endplate, the depth of the counterbore being greater than the thickness of the flange sealing means between the flange and the cylinder, a circumferential groove in the counterbore to receive a thrust ring formed of at least three segments and extending from the groove to overlap a portion of the flange, a locking ring spanning the remaining portion of the flange between the segments of the thrust ring and the non-flanged part of the endplate, and means for securing the locking ring in position.

In assembly, the endplate is inserted with the flanged side inwards, the segments of the thrust ring are inserted through the space between the non-flanged part of the endplate and the counterbore and then pressed outwards into their groove, and finally, the locking ring is inserted and secured in place. The locking ring holds the thrust ring segments in their groove and overlapping the flange, so that pressure on the inside (i.e., the flanged side) of the endplate is transmitted by the flange to the thrust ring segments and thence to the cylinder, with little or no load on the locking ring, so that the securing means for the latter is not subjected to any appreciable load. For removal, the locking ring is released and withdrawn, the thrust ring segments are moved inwardly clear of their groove and then withdrawn, to leave the endplate free to be withdrawn.

The cylinder is preferably provided with small radial holes emerging in the thrust ring groove, for facilitating pushing of the thrust ring segments from the groove, the number and spacing of the holes preferably affording two holes per segment, one towards each end. The outer ends of the holes are preferably tapped, for receiving a screw portion of an ejector pin (or pins).

The securing means for the locking ring preferably consist of a number of small screws passing through axially aligned holes around the locking ring and screwing into blind tapped holes in the flange of the endplate. The outer ends of the holes in the locking ring are preferably tapped, for receiving screws (of a larger diameter than the securing screws) to facilitate withdrawal of the locking ring.

The section of the locking ring, or the inner end of it, is preferably tapered slightly on the outside, to afford a wedging action urging the thrust ring segments into their groove, the segments preferably having a complementary taper on the inside. The inside of the locking ring may be similarly tapered—but to a lesser degree than outside—and the non-flanged part of the endplate provided with a complementary taper, so that the endplate will be secured firmly in the counterbore.

The inner edge of the flange is preferably bevelled to assist insertion in the counterbore in the cylinder.

The flange of the endplate is preferably blended into the non-flanged part by a radius, the locking ring having a corresponding radius, suitably relieved as may be necessary to allow for the axial movement of the locking ring for effecting any wedging action on the thrust ring segments and, possibly, on the endplate.

Thus, with an endplate provided with a hole for the supply of hydraulic fluid, the endplate may simply be rotated, before being secured, to bring the hole into the most convenient position, over 360°, for the particular location of the cylinder in mind.

An endplate for the piston rod end of a double-acting cylinder is provided with an axial hole for the piston rod, with a flanged bushing in the hole located by the flange fitting to the shoulder formed by a counterbore at the inside end of the hole in the endplate, and with a seal also fitting in the counterbore and abutting the flange of the bushing. Incorporation of the endplate of the present invention facilitates rapid replacement of the seal.

Figure 2:
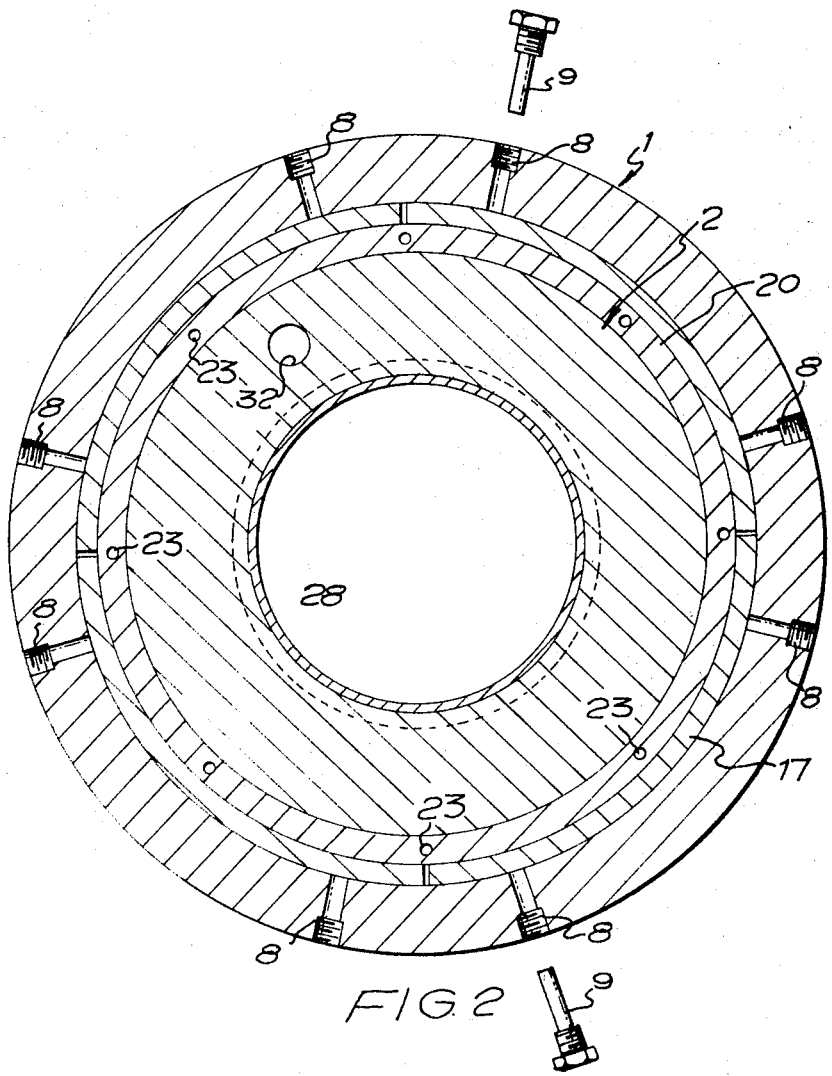

The invention will now be described in greater detail, by way of example, with reference to the accompanying drawings, in which:

FIGURE 1 is a sectional view through an end portion of a hydraulic cylinder with an endplate secured in position; and FIGURE 2 is a section on the line II—II of FIGURE 1.

In the drawings, a hydraulic cylinder is indicated at 1 and an endplate at 2, details of a piston etc. being omitted.

As can be seen in FIGURE 1 the cylinder has a counterbore 3 which terminates at its innermost end in a chamfer 4 and which contains circumferential grooves 5 and 6, the latter housing an annular sealing ring 7. Opposite the groove 5 at spaced intervals around the periphery of the cylinder are partially tapped radial holes 8 into each of which may be screwed an ejector pin 9 (see FIGURE 2).

The endplate 2 has a non-flanged body portion 10 and is provided at one side with a flange 11 which runs via radius 12 into a slightly tapered face 13 of the body portion. The flange 11 has an inner face 14 and an outer face 15 and is bevelled at 16 between the two.

A thrust ring 17 is located inside the groove 5 and extends therefrom to overlap a portion of the outer face 15 of the flange 11 and is formed of four segments as can be seen in FIGURE 2. The thrust ring 17 has a projecting and tapering face 18, which co-operates with a correspondingly tapering face 19 of a locking ring 20 which spans the remaining portion of the face 15 not occupied by the thrusting ring 17. The locking ring also has a tapered face 21 which co-operates with the face 13 of the endplate, the face 21 terminating in a radius 22 which co-operates with the radius 12 of the endplate.

Spaced around the flange 11 and entering at face 15 is a series of blind tapped holes 23, with which are aligned apertures or holes 24 in the locking ring, the upper portion of each aperture or hole 24 being tapped at 25. Into each of the aligned holes 23, 24 is a screw 26 which thus serves as a means for securing the locking ring in position.

The endplate illustrated is provided with an axial hole 27 for the piston rod (not shown) and has a flanged bushing 28 in the hole located by a flange 29 fitting a shoulder 30 formed by counterboring, with a seal 31 also fitting in the counterbore, and a hole 32 (see FIGURE 2) for hydraulic fluid supply.

To disassemble the end of the hydraulic cylinder above described, firstly the screws 26 are removed. This enables further screws (not shown) to be screwed into the tapped hole portion 25 of each aperture or hole 24 to enable the locking ring to be removed. The ejector pins 9 are screwed into the holes 8, to push each segment of thrust ring 17 out of the circumferential groove 5. Then the segments may be removed and the endplate, with re-assembly following the reverse of the above procedure. The need for this operation may be to replace the seal 31 after it becomes worn, for example. Alternatively, the invention may merely make possible the rotation of the endplate so that the hole 32 may be brought to the most convenient position over 360° for fluid supply connection.

What I claim is:

1. A hydraulic cylinder in combination with a circular endplate, said endplate including a body and a flanged part, said flanged part including a front flange face facing into said cylinder and a rear flange face facing away from said cylinder, said cylinder including a single counterbore to receive said flanged part, the depth of the counterbore being greater than the thickness of said flanged part, sealing means between said flanged part and said cylinder, said counterbore having a circumferential groove, a thrust ring fitted in said groove, said thrust ring including at least three segments extending radially inwardly from said groove so as to contact a portion of said rear flange face in blocking relationship, a locking ring spanning the remaining portion of said rear flange face between said thrust ring and said body so as to abut said thrust ring to maintain the same in said groove, said thrust ring being the only part receiving a substantial load from said endplate, and means for securing said locking ring in position.

2. A hydraulic cylinder as in claim 1, wherein said cylinder is provided with radial holes emerging in said thrust ring groove from the outside of said cylinder, and means for extending through said holes to engage said thrust ring to move the same inwardly for removal from said groove.

3. A hydraulic cylinder as in claim 1 wherein said securing means for said locking ring consists of a number of screws passing through axially aligned apertures around said locking ring and screwing into blind tapped holes in said flanged part of said endplate, and tapped means in said apertures for aiding in removal of said locking ring.

4. A hydraulic cylinder as in claim 1, wherein said locking ring has a tapering section only at the lower portion thereof, said thrust ring having a complementary taper.

5. A hydraulic cylinder as in claim 1 wherein the face of said locking ring adjacent said body of said endplate is tapered and said body is provided with a complimentary taper for firm securing of said locking ring with respect thereto.

6. A hydraulic cylinder as in claim 1, wherein said flanged part of said endplate is blended into said body by a radius, said locking ring having a corresponding radius, said radius of said endplate having a rounded relief for accommodating movement of said locking ring into abutting relationship with said thrust ring.

References Cited

UNITED STATES PATENTS 2,937,782   5/1960   Heimberger et al. _____ 220—55

FOREIGN PATENTS 556,555   10/1943   Great Britain.

JAMES B. MARBERT, *Primary Examiner.*